(No Model.) 3 Sheets—Sheet 2.
J. D. HEMPHILL.
MACHINE FOR CUTTING KNITTED FABRICS.
No. 546,532. Patented Sept. 17, 1895.
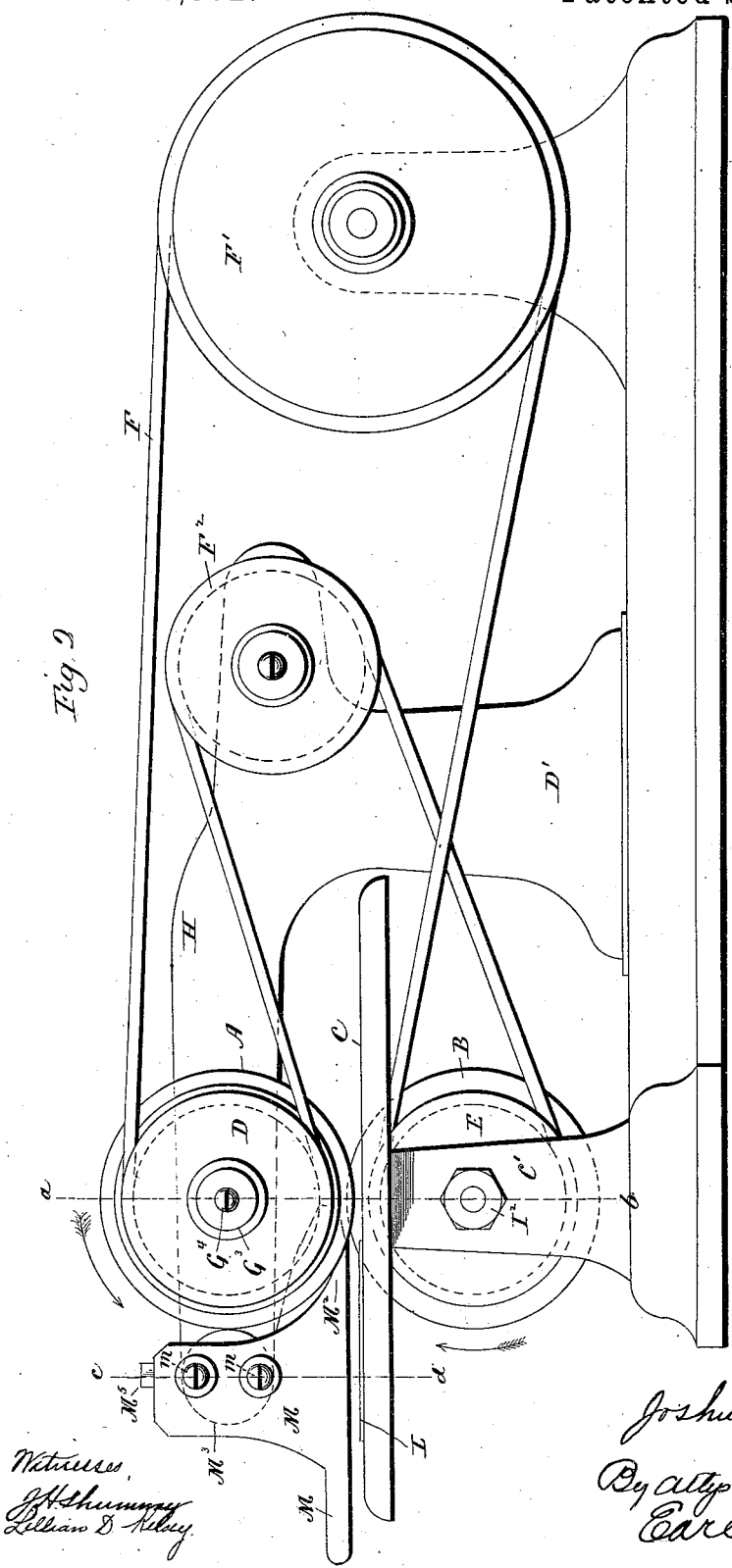

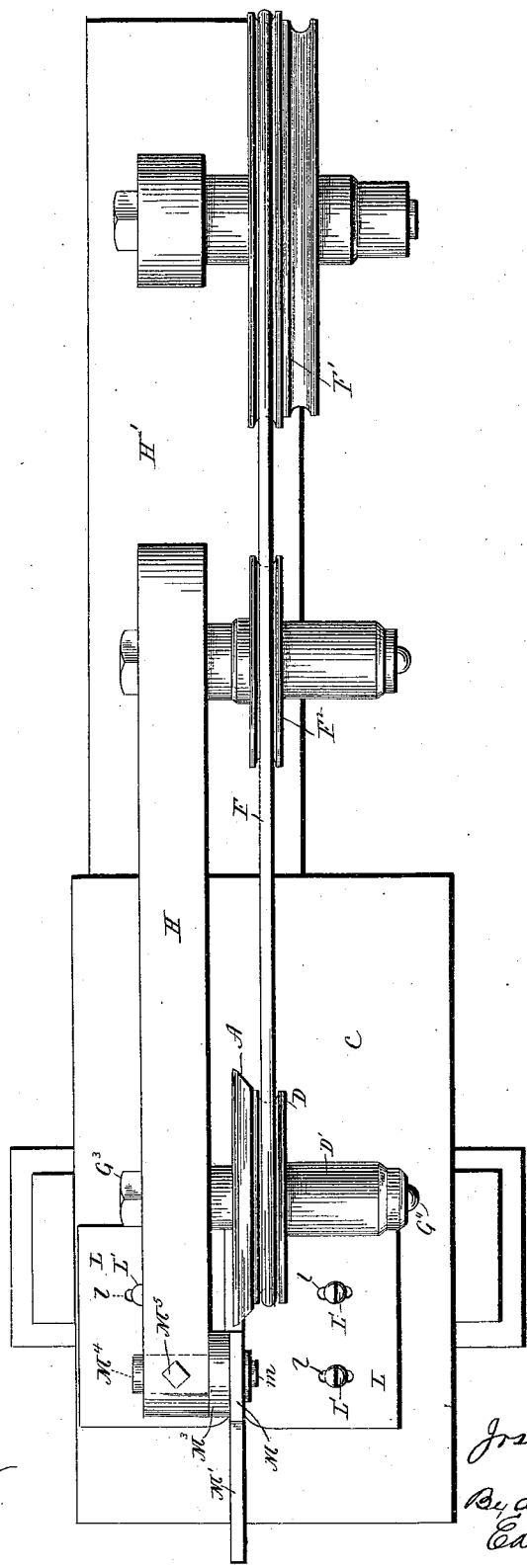

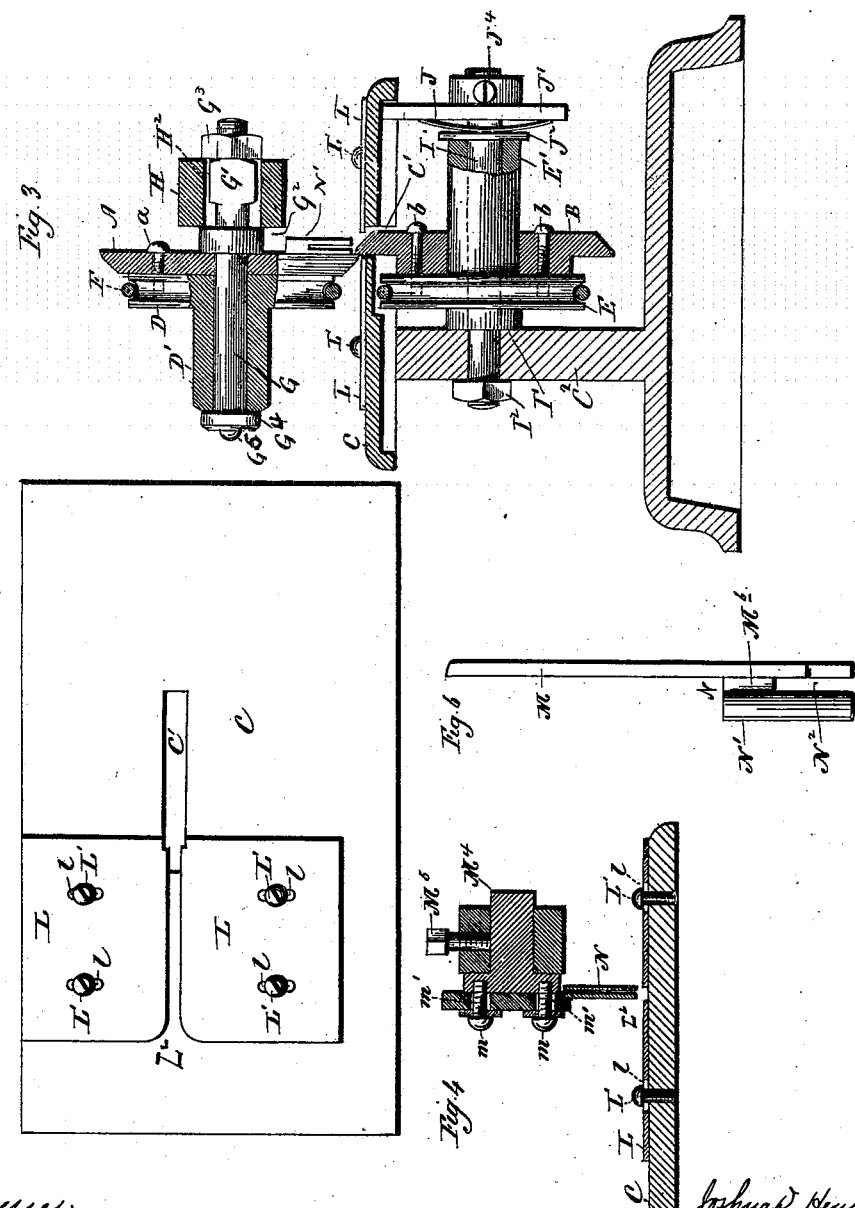

UNITED STATES PATENT OFFICE.

JOSHUA D. HEMPHILL, OF SHELTON, ASSIGNOR OF ONE-HALF TO GEORGE H. RADCLIFFE, OF DERBY, CONNECTICUT.

MACHINE FOR CUTTING KNITTED FABRICS.

SPECIFICATION forming part of Letters Patent No. 546,532, dated September 17, 1895.

Application filed April 22, 1895. Serial No. 546,671. (No model.)

*To all whom it may concern:*

Be it known that I, JOSHUA D. HEMPHILL, of Shelton, in the county of Fairfield and State of Connecticut, have invented a new Improvement in Machines for Cutting Knitted Fabrics; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a machine constructed in accordance with my invention; Fig. 2, a side view thereof; Fig. 3, a view of the machine in vertical transverse section on the line $a\,b$ of Fig. 2; Fig. 4, a similar view on the line $c\,d$ of the same figure; Fig. 5, a detached plan view of the work-table, showing the lateral adjustable horizontal guide-plates mounted thereupon.

My invention relates to an improvement in machines for cutting knitted fabric, and is particularly designed for cutting up the material from which collars and cuffs for underwear are made, the object being to produce a simple, conveniently-operated, and effective device.

With these ends in view my invention consists in a machine having certain details of construction and combinations of parts, as will be hereinafter described, and pointed out in the claims.

In carrying out my invention I employ two disk-shaped cutters A and B, located one above the other, and respectively above and below the horizontal work-table C, which is constructed with a longitudinally-arranged elongated clearance-opening C', through which the lower cutter B extends upward into position to overlap and bear against the flat face of the upper cutter A. The said upper cutter A is rigidly secured by bolts $a$ to a grooved pulley D, while the lower cutter B is secured by bolts $b$ to a grooved pulley E. The said pulleys D and E receive a round belt F, driven from a driving-pulley F', located at the rear end of the machine. The said belt also passes over an idle pulley $F^2$, located in rear of the work-table C, but forward of the pulley F, and by the use of which I am enabled to drive the cutting-edges of both of the cutters in the same direction from a single belt, but they may be driven independently by separate belts, if preferred. The pulley D is constructed with a long hub D', and journaled upon the outer end of a horizontally-arranged stud G, mounted toward the forward end of the long horizontal arm H of the machine-frame H', the said arm being arranged longitudinally with the length of the machine-frame, and extending longitudinally over the work-table, very slightly to one side of the center thereof. The said stud is constructed with a squared head G', preventing it from turning, and located in a vertically-arranged slot $H^2$, formed in the arm H, the said head being vertically adjustable within the length of the said slot for the purpose of raising and lowering the stud, and hence the upper cutter A. The said stud is also constructed with an annular shoulder $G^2$, which bears upon the inner face of the arm, against which it is drawn by means of a nut $G^3$, applied to the threaded inner end of the stud, and bearing against the outer face of the arm, as clearly shown in Fig. 3. The flat face of the cutter A bears against the outer face of the shoulder $G^2$, and the cutter A and the pulley D are maintained in place upon the stud by means of a washer $G^4$, bearing against the outer end of the stud and the outer end of the hub D', and secured by means of a screw $G^5$ passing through the washer into the said end of the stud. The pulley E is constructed with a long hub E', and journaled upon a horizontal stud I, mounted in one of the two posts $C^2$, which support the work-table C, the other not being shown. The said stud is constructed at its inner end with an annular shoulder I' bearing against the said post $C^2$ and drawn against the same by means of a nut $I^2$, applied to its extreme inner end, which is threaded. The edge of the cutter B is pressed yieldingly against the edge of the cutter A, by means of a spring J, mounted in a head or block J', applied to the outer end of the hub E' of the pulley E, which carries the said cutter B. The block J' is secured to the outer end of the stud by means of a screw J⁴, and, as required, adjusted back and forth, so as to vary the influence exerted by the spring. I do not, however, limit myself to the particular means shown and described for mounting and driving the two cutters. I wish particularly to point out that by arranging the cutters to do their work in the longitudinal plane of the work-table, my device becomes very convenient in use, inasmuch as the arm supporting the upper cutter is then located also in the longitudinal plane of the table, and does not interfere with the handling of the work.

As herein shown, two laterally-adjustable horizontal guide-plates L L are mounted upon the table, being thereto constructed with elongated slots $l\ l$ receiving screws L' L'. These plates have their inner edges slightly separated from each other, and are arranged in line with the opening C' formed in the work-table, as clearly shown in Fig. 5, the forward inner corners of the plates being cut away for clearness. The inner edges of these plates co-operate to form a guideway $L^2$ receiving the ribs of the material commonly made for working up into collars and cuffs for underwear, whereby the ribs are utilized in guiding the material in being cut on a line close to the ribs. The machine is also provided with a lateral and vertically-adjustable vertical guide, consisting of a plate M, having a long forwardly-projecting horizontal finger M' and a rearwardly-projecting finger $M^2$. The said plate is secured by its upper end by screws $m\ m$ to a circular head $M^3$, formed at one end of a heavy stud $M^4$, which is mounted in the extreme forward end of the arm H of the machine-frame H'. To permit the plate to be vertically adjusted, it is constructed with vertically-elongated slots $m'\ m'$, through which the screws $m\ m$, before mentioned, pass. A set-screw $M^5$, mounted in the said arm, impinges against the stud and holds it in any desired position of lateral adjustment in which it may be set. A rib or shoulder $M^6$, horizontally arranged upon the inner face of the lower end of the vertical plate M, provides for the attachment of a leaf N, which co-operates with the plate M in guiding the fabric, the outer end of the leaf being flared outward, as at N'. The passage $N^2$ formed between the leaf and plate, as seen in Fig. 6, is located directly above the guideway $L^2$, formed between the inner edges of the plates L, forming the lateral guides. By providing for the vertical adjustment of the plate M, I am enabled to shift the same up or down, as may be required, by variations in the thickness and the character of the fabric to be operated upon.

When my improved device is used for cutting up ribbed fabric into collars and cuffs for underwear, I shall, by preference, employ the lateral plates and the vertical guide, for by engaging with the ribs of such fabric they greatly assist in the convenient and speedy feeding thereof; but when the device is employed for cutting up plain knitted goods the guide-plates and guide may be dispensed with, for I conceive that the machine may be used to excellent advantage in cutting up plain knitted goods—for instance, in accordance with a pattern placed upon them, or in accordance with marks drawn or printed on them.

I would have it understood that I do not limit myself to the exact construction shown and described, but hold myself at liberty to make such changes and alterations therein as fairly fall within the spirit and scope of my invention.

I am aware, however, that a trimming device employing two disk-shaped cutters respectively located above and below the work-table is old, and that it is old to adjust one of the cutters in such a machine toward and away from the other.

I am further aware that trimming devices have been provided with adjustable guides. I do not, therefore, broadly claim any of the constructions referred to.

Having fully described my invention, what I claim as new, and desire to secure by Letters Patent, is—

1. In a machine for cutting knitted fabric, the combination with a work-table constructed with a longitudinally arranged clearance opening, of two disk-shaped cutters respectively located above and below the said table in the longitudinal plane thereof, one of them passing through the said opening and overlapping the other, means extending parallel with the length of the table for driving the cutters to move their cutting edges in the same direction, two parallel guides mounted upon the table with a space between their inner edges to form a guide-way in line with the edges of the cutters, and a vertical guide located above the said space, substantially as described, and whereby the work may be fed directly inward away from the operator and with the length of the table.

2. In a machine for cutting knitted fabric, the combination with the frame thereof provided with a horizontal arm, of a work-table mounted upon the said frame below the said arm, extending parallel with the length thereof and constructed with a longitudinally arranged clearance opening, two disk-shaped cutters respectively located above and below the said table in the longitudinal plane thereof, one of them being mounted in the said arm, and one of them extending through the said opening to overlap the other, means located in the longitudinal plane of the table and arm for driving the cutters to move their cutting edges in the same direction, two laterally adjustable guides located upon the table and having their inner edges separated to form a guide-way between them in line with the cutters, and a vertical guide located over the said guide-way, provided upon its inner face with a vertically arranged leaf co-operating with it to form a passage for the work, and connected with the outer end of the said arm, substantially as described, and whereby the work may be fed directly inward away from the operator and with the length of the table.

In testimony whereof I have signed this specification in the presence of two subscribing witnesses.

JOSHUA D. HEMPHILL.

Witnesses:
FRED C. EARLE,
LILLIAN D. KELSEY.